G. P. & P. D. BURKE.
CUT-OFF DEVICE FOR FEED HOPPERS.
APPLICATION FILED JUNE 22, 1909.
954,850.
Patented Apr. 12, 1910.
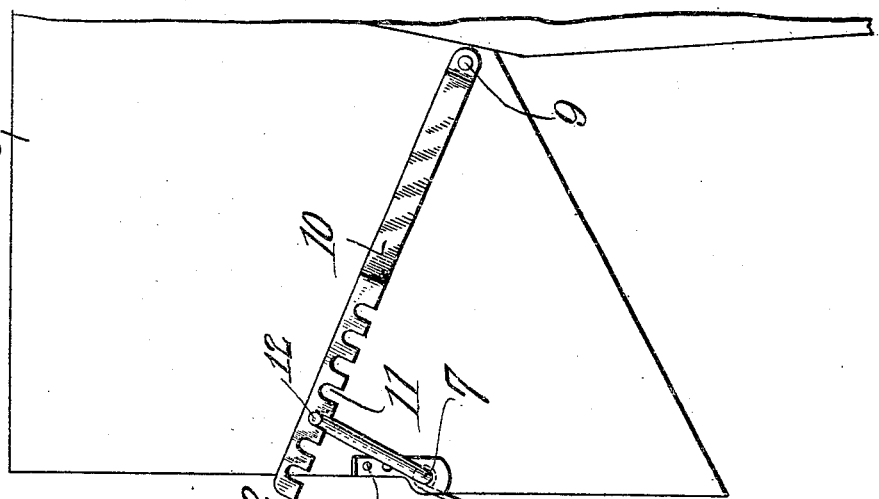
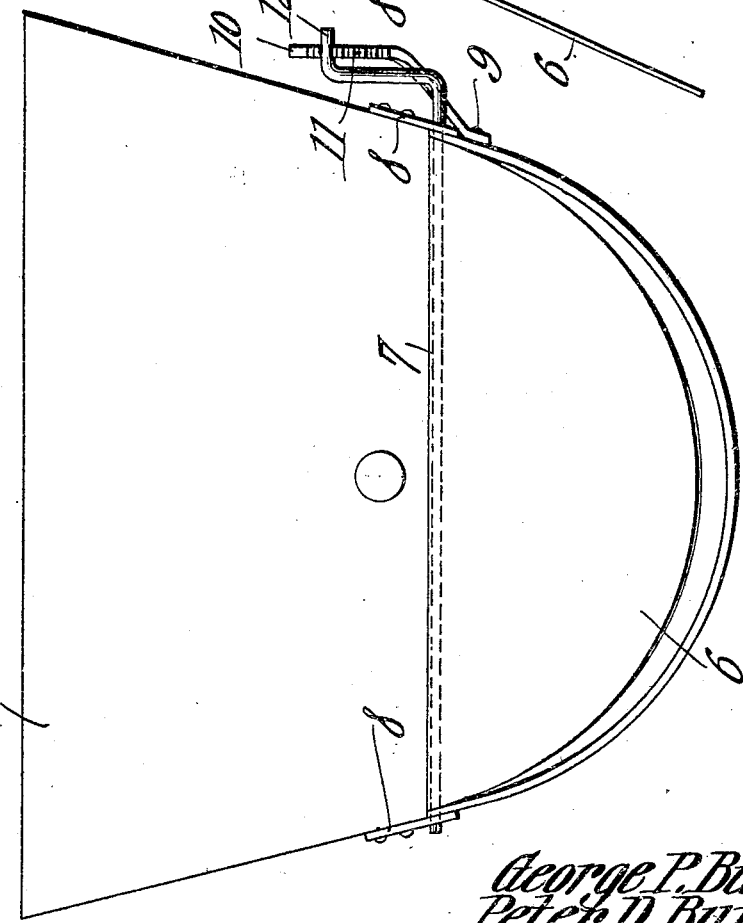
Inventors
George P. Burke
Peter D. Burke
By C. A. Snow & Co.
Attorneys

UNITED STATES PATENT OFFICE.

GEORGE P. BURKE AND PETER D. BURKE, OF ROSWELL, SOUTH DAKOTA.

CUT-OFF DEVICE FOR FEED-HOPPERS.

954,850.  Specification of Letters Patent.  Patented Apr. 12, 1910.

Application filed June 22, 1909. Serial No. 503,685.

*To all whom it may concern:*

Be it known that we, GEORGE P. BURKE and PETER D. BURKE, citizens of the United States, residing at Roswell, in the county of Miner, State of South Dakota, have invented a new and useful Cut-Off Device for Feed-Hoppers, of which the following is a specification.

This invention is a cut off device for hoppers designed to regulate the amount of material discharging from the hopper, and its object is to provide a device of this kind which is simple in structure, and which can be readily adjusted from the outside of the hopper, so that there will be no interference with the contents thereof.

With the herein stated objects in view, the invention consists in a novel construction and arrangement of parts, to be hereinafter described and claimed, reference being had to the drawing hereto annexed, in which:—

Figure 1 is a front elevation, showing the application of the invention, and Fig. 2 is a side elevation.

Referring more particularly to the drawing, 5 denotes the lower or discharge end of a hopper, there being an opening in its front wall through which the material discharges. This opening is controlled by a valve which is a plate 6, shaped to conform to the shape of the opening, and the outline of the lower end of the hopper, and of such a size that it may completely cover the opening, if the flow of material is to be shut off entirely. The plate is secured at its upper edge to a rod 7, extending across the upper end of the opening, and mounted for rotation in ears 8, secured to the side walls of the hopper, whereby a pivotal connection for the plate 6 is had. The ears may be dispensed with, the rod being mounted through holes in the side walls of the hopper.

To one of the side walls of the hopper, on the outside thereof, is pivotally mounted at one of its ends, as indicated at 9, a bar 10, having at its free end, in its lower edge, a series of notches 11. One end of the rod 7 extends a suitable distance beyond one of the ears 8, and terminates in an off-set portion 12, located so as to engage one of the notches 11, whereby the rod is locked and the plate is thus held open the desired extent. A series of notches 11 is provided, in order that the plate may be locked in different positions. The off-set portion 12 also serves as a handle for turning the rod and adjusting the plate.

By the herein described arrangement of parts, the plate 6 can be readily swung open more or less, according to the rate of discharge desired, and it will be securely held in adjusted position upon engaging the part 12 with one of the notches 11. All the parts are on the outside of the hopper, and the material therein is therefore not disturbed when the adjustment is made. If desired the bar 10 may be fastened to the legs or frame of the hopper.

What is claimed is:—

The combination with a hopper, of a rod rotatably mounted thereon, on the outside thereof adjacent to its discharge opening, one end of the rod having an off-set portion, a plate fastened to the rod, and controlling the discharge opening, and a bar pivotally mounted at one of its ends on the hopper, and having at its free end a series of notches in its lower edge, adjustably engageable by the off-set portion of the rod for locking the plate in different angular positions.

In testimony that we claim the foregoing as our own, we have hereto affixed our signatures in the presence of two witnesses.

GEORGE P. BURKE.
PETER D. BURKE.

Witnesses:
E. O. BRATRUD,
C. A. BAKER.